United States Patent
Brault

(10) Patent No.: US 9,784,130 B2
(45) Date of Patent: Oct. 10, 2017

(54) TURBINE ENGINE COMPRISING AN UPSTREAM ATTACHMENT MEANS FOR A DE-OILING PIPE

(71) Applicant: SNECMA, Paris (FR)

(72) Inventor: Michel Gilbert Roland Brault, Quincy sous Senart (FR)

(73) Assignee: SNECMA, Paris (FR)

( * ) Notice: Subject to any disclaimer, the term of this patent is extended or adjusted under 35 U.S.C. 154(b) by 291 days.

(21) Appl. No.: 14/401,911

(22) PCT Filed: Jun. 3, 2013

(86) PCT No.: PCT/FR2013/051253
§ 371 (c)(1),
(2) Date: Nov. 18, 2014

(87) PCT Pub. No.: WO2013/182797
PCT Pub. Date: Dec. 12, 2013

(65) Prior Publication Data
US 2015/0167495 A1    Jun. 18, 2015

(30) Foreign Application Priority Data
Jun. 5, 2012  (FR) ..................................... 12 55230

(51) Int. Cl.
*F01D 25/18* (2006.01)
*F02C 7/36* (2006.01)

(52) U.S. Cl.
CPC ................ *F01D 25/18* (2013.01); *F02C 7/36* (2013.01); *Y02T 50/671* (2013.01)

(58) Field of Classification Search
CPC .......... F01D 25/18; F01D 25/28; F04D 29/04; F04D 29/043; F04D 29/05; F04D 29/053;
(Continued)

(56) References Cited

U.S. PATENT DOCUMENTS 5,257,903 A * 11/1993 Allmon ................... F01D 25/18
                                                                 184/6.23
6,325,381 B1 * 12/2001 von Engelbrechten
                                                     ............................. F16J 15/002
                                                                 277/361
(Continued)

FOREIGN PATENT DOCUMENTS

FR    2 926 604    7/2009
FR    2 928 566    9/2009

OTHER PUBLICATIONS

International Search Report issued Jul. 18, 2013 in PCT/FR13/051253 filed Jun. 3, 2013.

*Primary Examiner* — Woody Lee, Jr.
*Assistant Examiner* — Eric Zamora Alvarez
(74) *Attorney, Agent, or Firm* — Oblon, McClelland, Maier & Neustadt, L.L.P.

(57) ABSTRACT

A turbine engine in which an air flow circulates from upstream to downstream, or for an aircraft, including a rotary shaft extending axially and a de-oiling tube mounted to be rigidly connected to and on the inside of the shaft by an upstream fixing mechanism including: a first inner dog clutch extending on an inside from the shaft, a second dog clutch extending on an outside from the de-oiling tube, which is longitudinally aligned with the first dog clutch and positioned downstream of the first dog clutch, and an anti-rotation longitudinal locking latch extending between the rotary shaft and the de-oiling tube to prohibit rotation of the second dog clutch of the de-oiling tube relative to the first dog clutch of the rotary shaft.

9 Claims, 4 Drawing Sheets

(58) Field of Classification Search
CPC ............... F04D 29/054; F05D 2240/60; F05D 2240/61; F02C 7/32; F02C 7/36; F01M 11/03; B01D 45/16; Y02T 50/671
USPC ..................................... 192/41 R; 415/169.1
See application file for complete search history.

(56) References Cited

U.S. PATENT DOCUMENTS

| | | | |
|---|---|---|---|
| 7,704,029 B2* | 4/2010 | Blais | ............... F16D 1/06 411/197 |
| 7,811,052 B2* | 10/2010 | Guihard | .............. F01D 5/026 415/122.1 |
| 8,092,132 B2* | 1/2012 | Zink | .............. F16B 39/103 411/198 |
| 2009/0134243 A1 | 5/2009 | Mount et al. | |
| 2009/0282679 A1 | 11/2009 | Mons et al. | |
| 2010/0307167 A1 | 12/2010 | Morreale | |
| 2011/0176925 A1* | 7/2011 | Anderson | ........... F01D 5/3015 416/221 |
| 2013/0031882 A1 | 2/2013 | Mount et al. | |
| 2013/0111735 A1* | 5/2013 | Coffin | ............... F01D 5/026 29/525.11 |

\* cited by examiner

TURBINE ENGINE COMPRISING AN UPSTREAM ATTACHMENT MEANS FOR A DE-OILING PIPE

GENERAL TECHNICAL FIELD AND PRIOR ART

The present invention relates to the field of turbine engines and, in particular, to fixing a de-oiling tube in a shaft of a turbine engine for an aircraft.

A turbojet engine conventionally comprises at least one rotary shaft on which blades are mounted for accelerating an air flow from upstream to downstream in the body of the turbojet engine. The turbojet engine comprises a compressor part in an upstream region and a turbine part in a downstream region.

The turbojet engine comprises a structural housing in which the rotary shaft is mounted by means of bearings. To allow the bearings to be lubricated and cooled, the turbojet engine comprises a lubrication circuit allowing the lubrication oil to be transported to the bearings. The lubrication oil is located in oil tanks which are kept under pressure. To limit the pressure in the oil tanks, the turbojet engine conventionally comprises exhaust means for an air flow mixed with oil particles, and this is referred to as an "oily air flow". Before it is possible to return the oily air flow to the atmosphere, it is de-oiled by being introduced into a de-oiling tube mounted inside the rotary shaft of the turbojet engine. Such a de-oiling tube is disclosed for example by the patent application FR 2 926 604 by SNECMA and is known to a person skilled in the art as a "center vent".

FIG. 1 is partial cross section through a low-pressure shaft of a turbojet engine extending along the axial axis X-X, the low-pressure shaft 1 comprising an upstream compressor shaft 11 and a downstream turbine shaft 12. A de-oiling tube 2 is mounted in a rigidly connected manner in the shaft 1. The de-oiling tube 2 conventionally comprises an upstream part 21 and a downstream part 22 which are longitudinally aligned.

With reference to FIG. 2A, the upstream end of the turbine shaft 12 is mounted on the inside of the compressor shaft 11 and is rigidly connected thereto by a main nut 3 mounted from the upstream direction and on the outside of the turbine shaft 12. This connection using the main nut 3 allows torque to be transmitted between the turbine shaft 12 and the compressor shaft 11. The upstream part 21 of the de-oiling tube 2 is mounted inside the turbine shaft 12 by means of an auxiliary upstream nut 4, which exerts longitudinal pressure directed in the downstream direction on the de-oiling tube 2.

The downstream part 22 of the de-oiling tube 2 is mounted from the downstream direction in the upstream part 21 of the de-oiling tube 2 as shown in FIG. 2B. The de-oiling tube 2 comprises a mechanical resilient seal in the region of the connection so as to radially lock the tube 2 in the shaft 1. With reference to FIG. 2C, the downstream end of the tube 2 is locked in the downstream region by an auxiliary downstream nut 6, which allows longitudinal pressure directed in the upstream direction to be exerted on the de-oiling tube 2, the auxiliary downstream nut 6 being mounted inside the turbine shaft 12.

Again with reference to FIG. 2A, the compressor shaft 11 comprises a radial opening 10 from which an oily air flow H is ejected that is intended to be entrained by a rotating air flow F circulating axially in the de-oiling tube 2. Conventionally, the oily air flow is entrained in a vortex to allow it to be de-oiled. The upstream mounting means of the de-oiling tube 2 form a portion that projects upstream which disrupts the introduction of the oily air flow H into the de-oiling tube 2. In particular, it has been determined that the longitudinal distance L between the ejection opening 10 and the upstream fixing means of the de-oiling tube 2 plays a major role in the disruption. When this distance L is small, of approximately 40 mm, the air flow is disrupted. Moreover, in addition to their size, the upstream fixing means of the de-oiling tube 2 are complex owing to the fact that they require an upstream and an auxiliary downstream nut, which is disadvantageous.

BRIEF DESCRIPTION OF THE INVENTION

In order to overcome at least some of these drawbacks, the invention relates to a turbine engine in which an air flow circulates from upstream to downstream, in particular for an aircraft, comprising a rotary shaft extending axially and a de-oiling tube mounted so as to be rigidly connected to and on the inside of said shaft by upstream fixing means, the upstream fixing means comprising a first inner dog clutch extending on the inside from the shaft, a second dog clutch extending on the outside from the de-oiling tube, which is longitudinally aligned with the first dog clutch and positioned downstream of the first dog clutch, and an anti-rotation longitudinal locking latch extending between the rotary shaft and the de-oiling tube so as to prohibit the rotation of the second dog clutch of the de-oiling tube relative to the first dog clutch of the rotary shaft.

The upstream fixing means according to the invention advantageously allow the de-oiling tube to be rigidly connected to the shaft by locking the axial translation on one hand and the relative rotation on the other hand, while avoiding the use of an auxiliary upstream nut, which is the source of disruption to the oily air flow. Furthermore, such fixing means are compact and are easy to mount. Moreover, the mass of the fixing means is reduced, thereby providing an advantage in terms of fuel consumption. Owing to the invention, the distance between the ejection opening and the upstream fixing means of the de-oiling tube is advantageously increased, thereby limiting the disruptions to the air flow.

Preferably, the locking latch comprises an annular body. More preferably, the locking latch comprises at least one axial tab extending between two consecutive teeth of the first inner dog clutch and between two consecutive teeth of the second outer dog clutch. The tabs advantageously allow the relative rotation between the shaft and the de-oiling tube to be locked.

According to one aspect of the invention, the upstream fixing means comprise an axial locking ring, which is mounted between the de-oiling tube and the anti-rotation locking latch, so as to prohibit the axial displacement of the locking latch relative to the shaft. Owing to the locking ring, the latch is radially pressed against the shaft, thereby preventing axial displacement of said shaft. Such a ring has a simple design and can be easily mounted in the stressed state.

Preferably, the de-oiling tube comprises an annular compartment in which the axial locking ring is mounted. Therefore, in the stressed state, the locking ring does not project from its compartment and does not prevent the latch from being mounted between the de-oiling tube and the shaft.

More preferably, the locking latch comprises an annular groove capable of being in contact with the axial locking ring and thus of guiding when it exerts its radial pressure towards the outside. Still preferably, the axial locking ring is resilient so as to be mounted in a prestressed manner. Preferably, the ring is slotted so as to have resilient properties.

Preferably, the locking latch comprises at least one radial demounting opening capable of allowing a demounting tool to be inserted into said demounting opening from the upstream direction.

According to one aspect of the invention, the turbine engine comprises an annular cover plate which covers the upstream ends of the de-oiling tube and of the shaft. Therefore, the fixing means do not disrupt the oily air flow when it is introduced into the de-oiling tube.

The invention also relates to a method for fixing a de-oiling tube in a rotary shaft of a turbine engine in which an air flow circulates from upstream to downstream, in particular for an aircraft, the shaft comprising a first inner dog clutch extending on the inside, the de-oiling tube comprising a second dog clutch extending on the outside, said method comprising:
  a step of inserting the de-oiling tube into the shaft from the upstream direction,
  a step of angularly orienting the de-oiling tube such that the second dog clutch is not longitudinally aligned with the first dog clutch,
  a step of axial displacement towards the downstream end of the de-oiling tube such that the second dog clutch is positioned downstream of the first dog clutch,
  a step of angularly orienting the de-oiling tube such that the second dog clutch is longitudinally aligned with the first dog clutch, and
  a step of inserting an anti-rotation longitudinal locking latch between the shaft and the de-oiling tube so as to prohibit the rotation of the second dog clutch of the de-oiling tube relative to the first dog clutch of the shaft.

Preferably, the method comprises a step of inserting a locking ring between the shaft and the de-oiling tube prior to inserting the locking latch.

DESCRIPTION OF THE DRAWINGS

The invention will be better understood when reading the following description given solely by way of example and with reference to the accompanying drawings, in which.

It should be noted that the drawings disclose the invention in a detailed manner in order to carry out the invention, and said drawings can of course serve to give a better definition of the invention where appropriate.

DESCRIPTION OF ONE OR MORE EMBODIMENTS AND USES

The invention is described for a twin-spool aircraft turbojet engine, comprising a low-pressure spool and a high-pressure spool for propelling an aircraft, but it goes without saying that the invention is applicable to any turbine engine.

Figure 3:
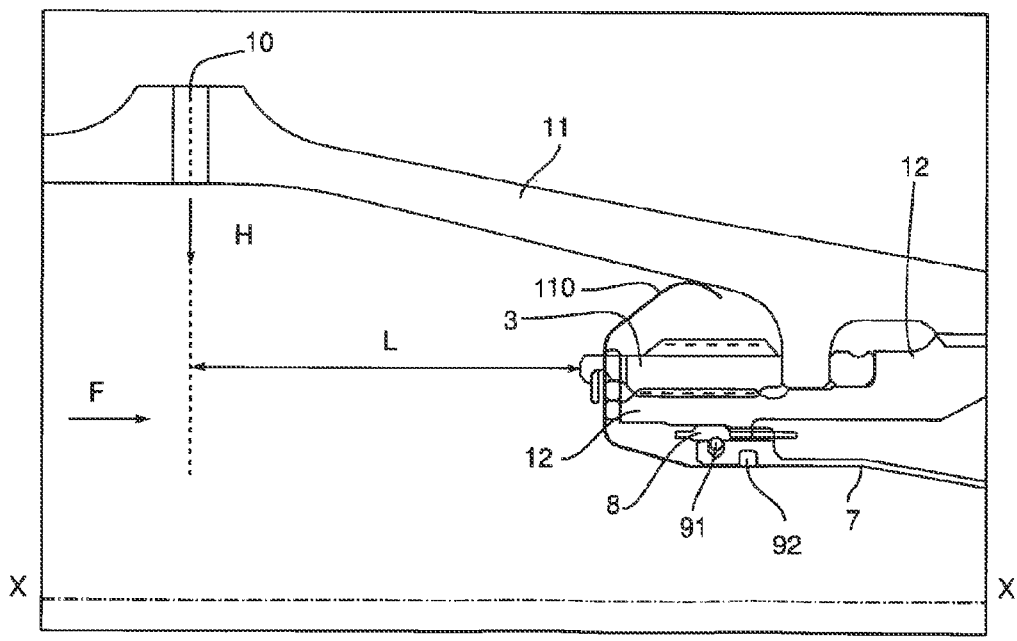
FIG. 3 is a schematic axial section through the upstream fixing means of the de-oiling tube according to the invention.

FIG. 3 is a cross section through the low-pressure shaft of the turbojet engine extending along the axial axis X-X, the low-pressure shaft 1 comprising an upstream compressor shaft 11 and a downstream turbine shaft 12. The compressor shaft 11 is in the form of an annular piece which comprises de-oiling openings 10 extending radially. A de-oiling opening 10 allows an oily air flow H to be ejected inside the compressor shaft 11. With reference to FIG. 3, the turbine shaft 12 is in the form of an annular piece of which the upstream end is mounted inside the compressor shaft 11 and is rigidly connected thereto by a main nut 3 mounted from the upstream direction and on the outside of the turbine shaft 12. This connection using the main nut 3 allows torque to be transmitted between the turbine shaft 12 and the compressor shaft 11. According to the invention, the lateral dimensions of the main nut 3 have been reduced in comparison with the prior art, while the same number of screw threads have been maintained in order to maintain the same degree of fixation. As shown in FIG. 3, the main nut 3 is axially tightened against a radial stop of the compressor shaft 11 in a manner similar to that found in the prior art.

Figure 1:
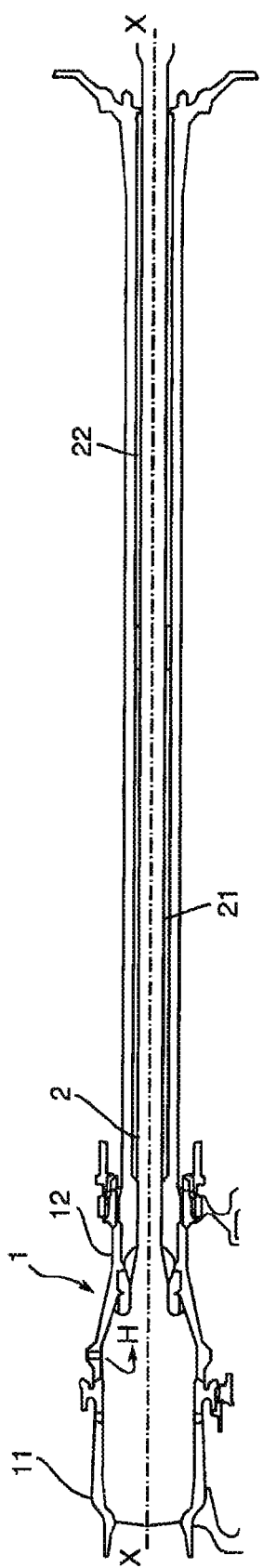
FIG. 1 is a schematic axial section through the assembly of a de-oiling tube in a shaft of a turbine engine (already discussed)
Figure 2B:
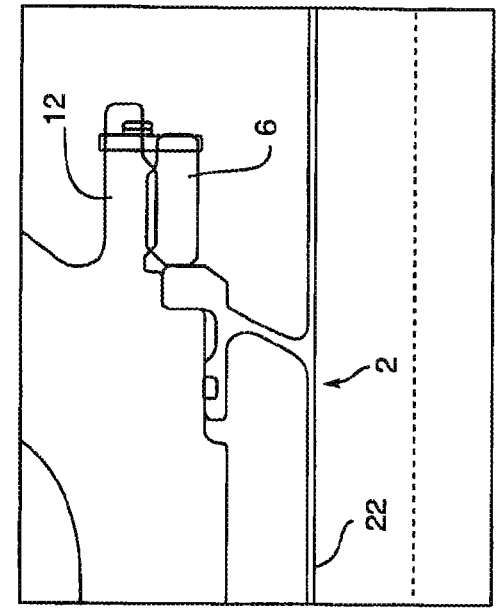
FIG. 2B is a schematic axial section through the central support of the de-oiling tube (already discussed)
Figure 2C:
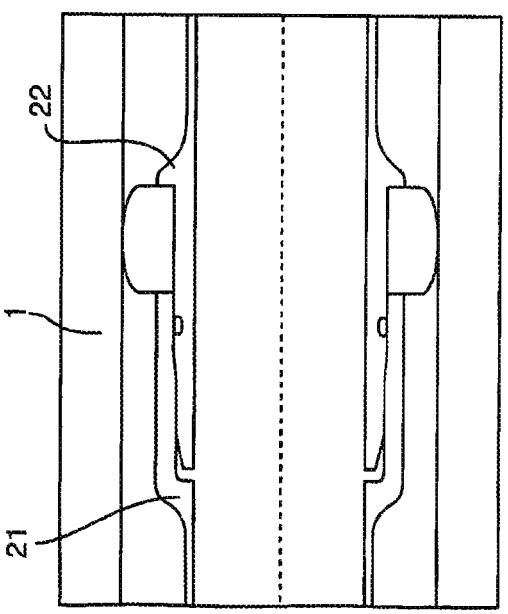
FIG. 2C is a schematic axial section through the downstream fixing means of the de-oiling tube (already discussed)
Figure 2A:
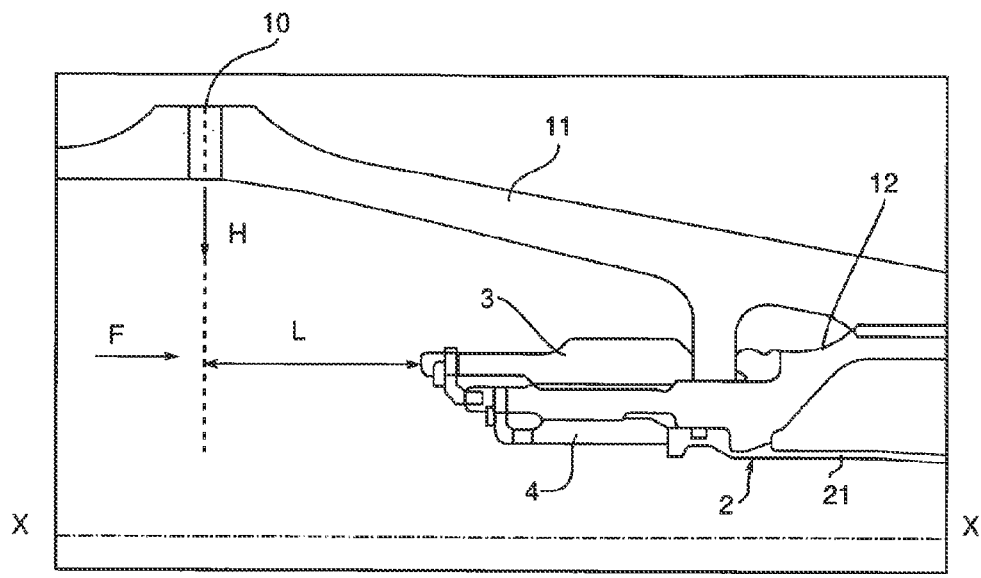
FIG. 2A is a schematic axial section through the upstream fixing means of the de-oiling tube according to the prior art (already discussed)

According to the invention, the turbojet engine comprises a de-oiling tube 7 mounted in a rigidly connected manner inside the turbine shaft 12. The de-oiling tube 7 is in the form of an annular piece extending axially in the turbojet engine along an axis X-X. In a manner similar to that found in the prior art, the de-oiling tube 7 comprises an upstream part and a downstream part which are longitudinally aligned. The invention also relates to the upstream fixing means of the de-oiling tube 7 in the turbine shaft 12, and the central support means and the downstream fixing means are identical to the prior art as described above in FIGS. 2B and 2C.

Figure 4:
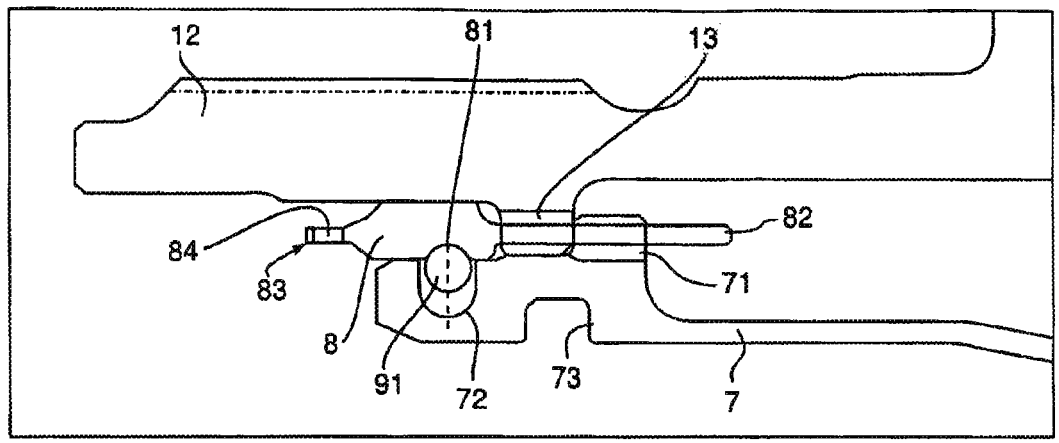
FIG. 4 is an enlarged schematic axial section through the upstream fixing means of the de-oiling tube from FIG. 3.
Figure 5:
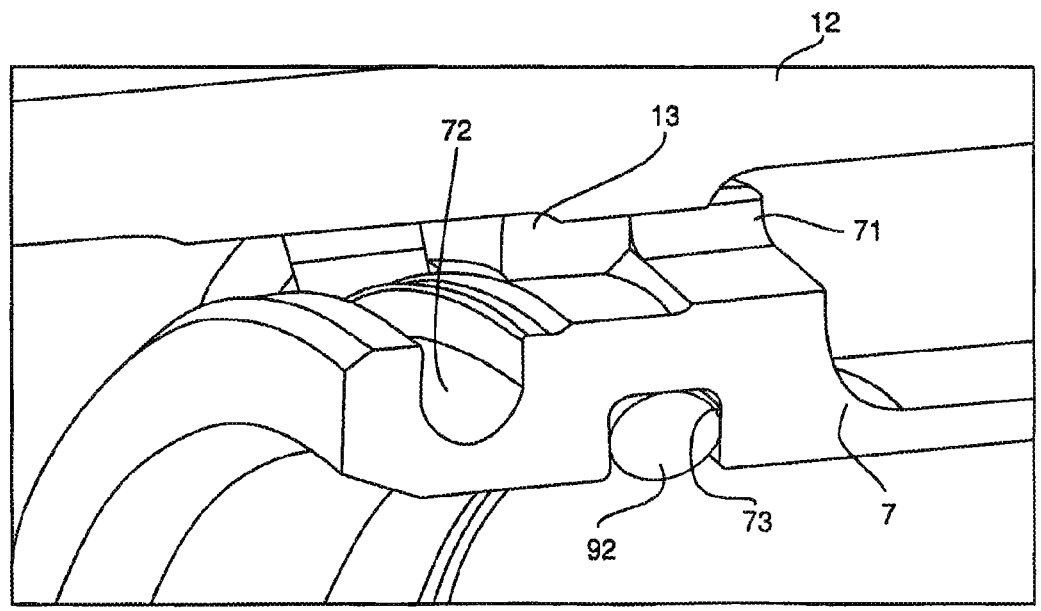
FIG. 5 is a schematic perspective cut-away view of the upstream fixing means of the de-oiling tube from FIG. 3 without the locking latch.

With reference to FIG. 4, the turbine shaft 12 comprises a first dog clutch 13 which extends radially inwards and is referred to in the following as an inner dog clutch. As a reminder, a dog clutch is a set of projecting teeth, two consecutive teeth being separated by a space in which a tooth projecting from another dog clutch may engage. In this example, the inner dog clutch 13 comprises a plurality of projecting teeth oriented radially inwards and distributed at an angle to the inner periphery of the turbine shaft 12 as shown in FIGS. 4 and 5.

With reference to FIG. 4, the de-oiling tube 7 comprises a second dog clutch 71 which extends radially outwards and is referred to in the following as an outer dog clutch. In this example, the outer dog clutch 71 comprises a plurality of projecting teeth oriented radially outwards and distributed at an angle to the outer periphery of the de-oiling tube 7 as shown in FIGS. 4 and 5. The radial distance of the dog clutches 13, 71 from the axis X-X of the turbojet engine is identical so as to prevent radial displacement of the dog clutches 13, 71 relative to each other when the teeth of the dog clutches 13, 71 are longitudinally aligned, that is to say parallel to the axis X-X of the turbojet engine.

As shown in FIG. 4, in a fixing position, the inner dog clutch 13 is longitudinally aligned with the outer dog clutch 71 of the de-oiling tube 7. Said tube is positioned downstream of the inner dog clutch 13 of the shaft 1 so as to prevent any axial displacement upstream of the de-oiling tube 7, and this advantageously avoids an auxiliary nut being required upstream of the de-oiling tube 7, so that it is compact.

According to the invention, with reference to FIG. 4, the turbojet engine further comprises an anti-rotation longitudinal locking latch 8 extending between the turbine shaft 12 and the de-oiling tube 7 so as to prohibit the rotation of the second dog clutch 71 of the de-oiling tube 7 relative to the first dog clutch 13 of the rotary shaft 1.

Figure 6:
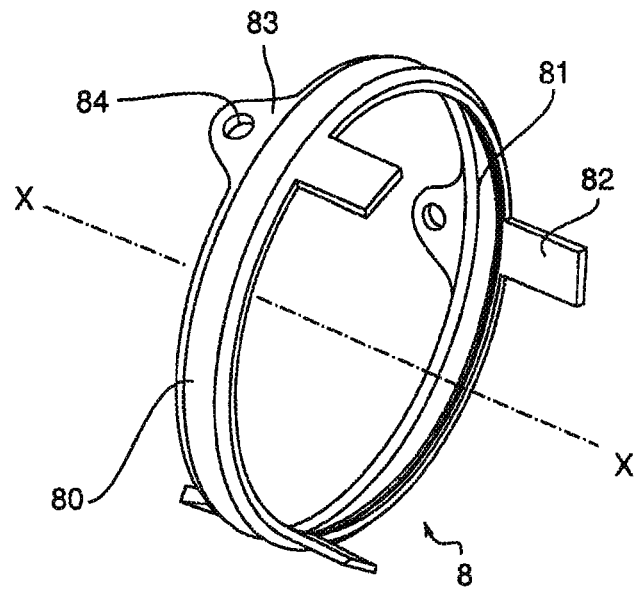
FIG. 6 is a schematic perspective view of the locking latch.

As shown in FIG. 6, the locking latch 8 comprises an annular body 80 extending axially along the axis X-X in the turbojet engine and three locking tabs 82 extending longitudinally from the body 80 in the downstream direction. It goes without saying that the locking latch 8 may comprise a different number of tabs 82.

The tabs 82 are distributed angularly over the circumference of the locking latch 8. In this example, each tab 82 is in the shape of a curved rectangle so that it can be placed between the teeth of the dog clutches 13, 71. With reference to FIG. 4, the locking tabs 82 are capable of extending between two consecutive teeth of an inner dog clutch 13 or outer dog clutch 71 to form an anti-rotation means. By way of example, if the de-oiling tube 7 is turned while a tab 82 is positioned between two consecutive teeth of the outer dog clutch 71, one of the teeth will come into contact with the tab 82 along one of its lateral faces, and this will lock the rotation. In other words, the combination of the dog clutches 71, 13 and the locking latch 8 allows the de-oiling tube 7 to be rigidly fixed to the turbine shaft 12 by prohibiting any rotation and any axial displacement.

Preferably, the upstream fixing means comprise an axial locking ring 91, which is mounted between the de-oiling tube 7 and the anti-rotation locking latch 8, so as to prohibit the axial displacement of the de-oiling tube 7 relative to the locking latch 8. The axial locking ring 91 is in the form of a slotted metal ring so as to have resilient properties so that it can be radially compressed.

In order to allow the axial locking ring 91 to be mounted, the de-oiling tube 7 comprises an annular compartment 72 positioned upstream of the outer dog clutch 71, as shown in FIG. 4. The annular compartment 72 is in the form of an annular groove of which the cavity faces outwards and of which the radial depth is capable of receiving the axial locking ring 91 in its entirety. Meanwhile, the locking latch 8 comprises an annular groove 81 of which the cavity faces inwards and which is capable of being in contact with the axial locking ring 91 in order to limit its outward radial displacement. As described in further detail in the following, the axial locking ring 91 is mounted in a prestressed state between the de-oiling tube 7 and the locking latch 8 such that it exerts a radial force on the locking latch 8 so as to press it against the turbine shaft 12 and thus prevent it from being axially displaced.

With reference to FIG. 6, the locking latch 8 comprises three demounting lugs 83 which extend longitudinally in the upstream direction from the annular body 80 thereof. The demounting lugs 83 are distributed angularly over the circumference of the locking latch 8. It goes without saying that the locking latch 8 may comprise a different number of demounting lugs 83. Each demounting lug 83 comprises a radial demounting opening 84 capable of allowing a demounting tool to be introduced from the upstream direction into said demounting opening 84, for example toothed pliers, as described in greater detail in the following. Preferably, as shown in FIG. 6, the demounting lugs 83 are longitudinally aligned with the locking tabs 82 so that a longitudinal force applied to a demounting lug 83 is applied directly to a locking tab 82.

Still with reference to FIG. 4, the de-oiling tube 7 comprises an annular groove 73, positioned upstream of the outer dog clutch 71, of which the cavity faces inwards and of which the radial depth is capable of receiving, in its entirety, a seal 92 of an annular cover plate 110 which covers the upstream ends of the de-oiling tube 7 and of the turbine shaft 12, as shown in FIG. 3. The seal 92 is annular in this example. The cover plate 110 is annular and has a U-shaped cross section facing downstream so to provide an aerodynamic profile for the air circulating inside the shaft 1. Preferably, the radially upper end of the cover plate 110 is in contact with the inner surface of the compressor shaft 11 so as to limit any disruption to the air flow at the connection between the compressor shaft 11, the turbine shaft 12 and the de-oiling tube 7. The seal 92 allows air to be prevented from circulating between the plate 110 and the de-oiling tube 7, as shown in FIG. 3. Preferably, the cover plate 110 is slotted to make it easier to mount.

The method for fixing the de-oiling tube 7 in the turbine shaft 12 will now be described. During a first step, the de-oiling tube 7 is inserted into the turbine shaft 12 from the upstream direction. Then, the de-oiling tube 7 is angularly oriented so that the second outer dog clutch 71 is not longitudinally aligned with the first inner dog clutch 13 of the turbine shaft 12. Therefore, the de-oiling tube 7 may be axially displaced in the downstream direction so that the second outer dog clutch 71 is positioned downstream of the first inner dog clutch 13. Indeed, the teeth of the second outer dog clutch 71 may engage in the spaces made between two consecutive teeth of the first inner dog clutch 13.

Figure 7:
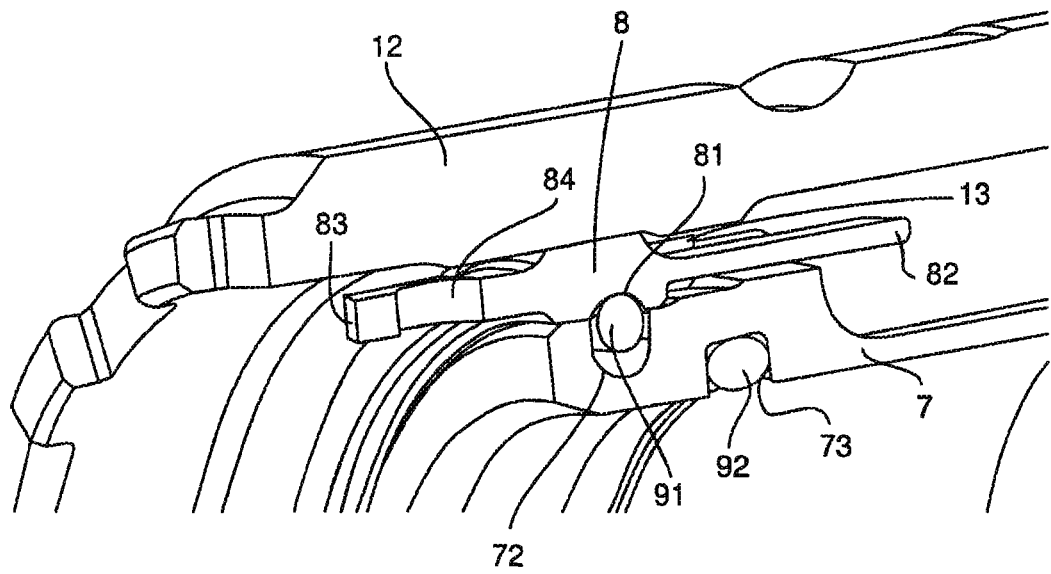
FIG. 7 is a schematic perspective cut-away view of the upstream fixing means of the de-oiling tube from FIG. 3 with the locking latch.

Then, as shown in FIG. 5, the de-oiling tube 7 is angularly oriented so that the second dog clutch 71 is longitudinally aligned with the first dog clutch 13. Thus, any axial displacement of the de-oiling tube 7 in the upstream direction is prohibited. Then, the locking ring 91 is introduced under stress into the compartment 72 in the de-oiling tube 7 and the locking latch 8 is inserted axially so as to be positioned between the turbine shaft 12 and the de-oiling tube 7. Once the tabs 82 of the latch 8 have passed the inner dog clutch 71 and the outer dog clutch 13, the de-oiling tube 7 is locked in rotation. When the latch 8 is positioned, the locking ring 91 expands radially outwards and comes into contact with the annular groove 81 in the latch 8 which is pressed radially against the inner surface of the turbine shaft 12. The locking latch 8 is thus axially locked against the turbine shaft 12, as shown in FIG. 7.

The seal 92 is inserted into the annular groove 73 before the cover plate 10 is placed inside the seal 92. Once in place, the seal 92 prevents any air from circulating between the plate 10 and the de-oiling tube 7. Preferably, the cover plate 10 comprises means for fixing to the main nut 3.

Conventionally, the de-oiling tube 7 is fixed in the downstream region by an auxiliary downstream nut which axially forces the de-oiling tube 7 against the inner dog clutch 13 of the turbine shaft 12. This axial force is transmitted to the outer dog clutch 13 which rests against the inner dog clutch 71.

In operation, when the de-oiling tube 7 is rigidly fixed to the turbine shaft 12, an oily air flow H is injected inside the shaft 1 through the ejection opening 10 and is entrained by an air flow F circulating from upstream to downstream in the de-oiling tube 7, as shown in FIG. 3. Owing to the omission of the auxiliary upstream nut for mounting the de-oiling tube 7, the longitudinal distance L between the ejection opening 10 and the fixing means for the de-oiling tube 7 is considerable (approximately 70 mm), thereby limiting any disruption to the air flow F and the oily air flow H and improving the de-oiling. Moreover, adding a cover plate 10 allows the air circulation to be improved, thereby further limiting disruptions.

During demounting, the cover plate 10 is removed and then, using a demounting tool of the toothed pliers type, the locking latch 8 is gripped by its demounting openings 84. Using the demounting tool, axial force is applied to the demounting lugs 83 of the latch 8 to forcibly remove the locking latch 8 by counteracting the pressing force exerted by the locking ring 91. Once the locking latch 8 is removed, the locking ring 91 is also removed from the turbojet engine. Then, the de-oiling tube 7 is angularly oriented so that the second outer dog clutch 71 is not longitudinally aligned with the first inner dog clutch 13 of the turbine shaft 12. Therefore, the de-oiling tube 7 may be axially displaced in the upstream direction, the teeth of the second outer dog clutch 71 engaging in the spaces made between two consecutive teeth of the first inner dog clutch 13. The de-oiling tube 7 is then removed from the turbojet engine in its entirety.

The invention has been described for mounting a de-oiling tube in a turbine shaft, but it goes without saying that it may be mounted in another type of shaft, for example a compressor shaft.

The invention claimed is:

1. A turbine engine in which an air flow circulates from upstream to downstream for an aircraft, comprising:
    a rotary shaft extending axially and a de-oiling tube mounted to be rigidly connected to and on an inside of the rotary shaft by upstream fixing means;
    the upstream fixing means comprising:
        a first inner dog clutch extending on an inside from the rotary shaft,
        a second dog clutch extending on an outside from the de-oiling tube, which is longitudinally aligned with the first inner dog clutch and positioned downstream of the first inner dog clutch,
        an anti-rotation longitudinal locking latch extending between the rotary shaft and the de-oiling tube to prohibit rotation of the second dog clutch of the de-oiling tube relative to the first inner dog clutch of the rotary shaft, and
        an axial locking ring, which is mounted between the de-oiling tube and the anti-rotation longitudinal locking latch, to prohibit axial displacement of the anti-rotation longitudinal locking latch relative to the rotary shaft.

2. A turbine engine according to claim 1, wherein the anti-rotation longitudinal locking latch comprises an annular body.

3. A turbine engine according to claim 2, wherein the anti-rotation longitudinal locking latch comprises at least one axial tab extending between two consecutive teeth of the first inner dog clutch and between two consecutive teeth of the second outer dog clutch.

4. A turbine engine according to claim 1, wherein the de-oiling tube comprises an annular compartment in which the axial locking ring is mounted.

5. A turbine engine according to claim 1, wherein the anti-rotation longitudinal locking latch comprises an annular groove configured to be in contact with the axial locking ring.

6. A turbine engine according to claim 1, wherein the axial locking ring is resilient.

7. A turbine engine according to claim 1, wherein the anti-rotation longitudinal locking latch comprises a radial demounting opening configured to allow a demounting tool to be inserted into the radial demounting opening from an upstream direction.

8. A turbine engine according to claim 1, wherein the turbine engine comprises an annular cover plate that covers upstream ends of the de-oiling tube and of the rotary shaft.

9. A method for fixing a de-oiling tube in a rotary shaft of a turbine engine in which an air flow circulates from upstream to downstream for an aircraft, the rotary shaft including a first inner dog clutch extending on an inside, the de-oiling tube including a second dog clutch extending on an outside, the method comprising:
    inserting the de-oiling tube into the rotary shaft from an upstream direction;
    angularly orienting the de-oiling tube such that the second dog clutch is not longitudinally aligned with the first inner dog clutch;
    axial displacement of the de-oiling tube in a downstream direction such that the second dog clutch is positioned downstream of the first inner dog clutch;
    angularly orienting the de-oiling tube such that the second dog clutch is longitudinally aligned with the first inner dog clutch;
    inserting an anti-rotation longitudinal locking latch between the rotary shaft and the de-oiling tube to prohibit rotation of the second dog clutch of the de-oiling tube relative to the first inner dog clutch of the rotary shaft; and
    inserting an axial locking ring between the de-oiling tube and the anti-rotation longitudinal locking latch to prohibit axial displacement of the anti-rotation longitudinal locking latch relative to the rotary shaft.

* * * * *

UNITED STATES PATENT AND TRADEMARK OFFICE
CERTIFICATE OF CORRECTION

PATENT NO. : 9,784,130 B2
APPLICATION NO. : 14/401911
DATED : October 10, 2017
INVENTOR(S) : Michel Gilbert Roland Brault It is certified that error appears in the above-identified patent and that said Letters Patent is hereby corrected as shown below:

In the Specification

Column 6, Line 56, change "plate 10 is placed" to --plate 110 is placed--;

Column 6, Line 58, change "plate 10 and" to --plate 110 and--;

Column 6, Line 59, change "10 comprises" to --110 comprises--;

Column 7, Line 9, change "plate 10 allows" to --plate 110 allows--; and

Column 7, Line 12, change "plate 10 is removed" to --plate 110 is removed--.

Signed and Sealed this
Eleventh Day of June, 2019

Andrei Iancu
*Director of the United States Patent and Trademark Office*